United States Patent [19]

Horstmann

[11] 4,097,907
[45] Jun. 27, 1978

[54] METHOD AND APPARATUS FOR THE SUPPRESSION OF SWITCHING DISTURBANCES

[75] Inventor: Winfried Horstmann, Griesheim, Germany

[73] Assignee: Robert Bosch GmbH, Stuttgart, Germany

[21] Appl. No.: 763,591

[22] Filed: Jan. 28, 1977

[30] Foreign Application Priority Data

Jan. 30, 1976 Germany .............................. 2603420

[51] Int. Cl.² ............................................... H04L 7/00
[52] U.S. Cl. ..................................................... 360/33
[58] Field of Search ..................... 360/33, 36, 37, 64, 360/38; 358/149, 8

[56] References Cited

U.S. PATENT DOCUMENTS

| | | | |
|---|---|---|---|
| 3,235,662 | 2/1966 | Bopp | 360/36 |
| 3,454,719 | 7/1969 | Horstmann et al. | 358/149 |
| 3,580,991 | 5/1971 | Krause | 360/36 X |
| 3,763,317 | 10/1973 | Coleman, Jr. | 360/36 |

*Primary Examiner*—John H. Wolff

*Attorney, Agent, or Firm*—Ernest F. Marmorek

[57] ABSTRACT

A system for suppressing signal disturbances, which are due to switching from a first television signal to a second television signal, for use during a playback of the television signals on a magnetic tape recorder and in connection with an electronic switch for disconnecting the first television signal and connecting the second television signal to output terminals of the switch includes a delay line coupled between a demodulator and a timing error corrector for receiving and delaying the demodulated signals for a time substantially equal to a line period. Additionally, a switching sub-system is coupled to the demodulator for receiving and demodulated signals and the delayed demodulated signals, and for switching for a period of time substantially equal to the line period to generate another output signal from the demodulated signals; furthermore an amplitude filter is coupled to the switching subsystem, and the timing error corrector for receiving the output signals, and selectively passing synchronous signals, forming a portion of the output signals, to the timing error corrector.

4 Claims, 3 Drawing Figures

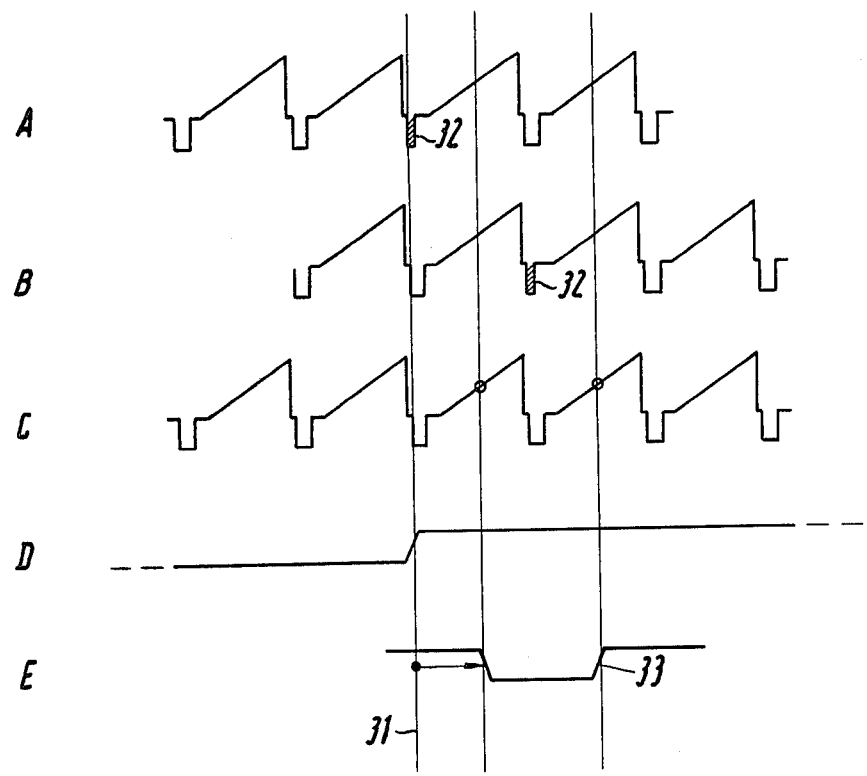

METHOD AND APPARATUS FOR THE SUPPRESSION OF SWITCHING DISTURBANCES

CROSS REFERENCE TO RELATED APPLICATIONS

Reference is had to the following co-pending patent applications assigned to the same assignee as the instant patent application:

| INVENTOR | PATENT APPLICATION | FILED |
|---|---|---|
| Ulrich Brauch et al. | Ser. No. 688,625 | May 21, 1976; |
| Peter Gunschmann | Ser. No. 604,626 | August 14, 1975, now U.S. Pat. No. 3,990,110; |
| Peter Gunschmann | Ser. No. 685,381 | May 11, 1976; |
| Peter Gunschmann et al. | Ser. No. 681,337 | April 28, 1976; |
| Rudolf Prochnow | Ser. No. 669,346 | March 22, 1976, now U.S. Pat. No. 4,032,986; |
| Rudolf Prochnow | Ser. No. 675,123 | April 8, 1976, since abandoned. |

BACKGROUND OF THE INVENTION

The invention relates to a system for suppressing signal disturbances, which are due to switching from a first television signal to a second television signal, for use during a playback of the television signals on a magnetic tape recorder.

Generally, the technology for dealing with the storage of wideband signals on a magnetic tape such as television signals are well known. Typical devices include magnetic head transducers mounted near the periphery of the rotatable headwheel for scanning a magnetic tape in successive track segments and at an angle to the longitudinal axis of the magnetic tape. The reproduction of television signals requires high resolution in that it is usually not possible to store the entire contents of a television image or of a television half-image on a single track segment. Thus, a television signal is stored in successive track segments in partial portions usually called "line packets". Each line has stored the image content along with a "line synchronous signal" and, in the case of a color television signal, also includes a "color synchronous signal" ("burst").

The reproduction or playback of television signals recorded in this way requires precise timing accuracy, that is, the playback timing signal must correspond very closely to the timing signal during the recording process. Generally, large timing errors can cause errors in synchronization of the television receiveer for the television signal and small timing signals can result in noticeable color or color-tone discrepancies. Thus, it is important to control the movement of the headwheel and the magnetic tape during the recording process to maintain a fixed relationship between each other. This means that at the same time the synchronous signal portion in the television signal must correspond with a "studio-timing-signal" with respect to frequency and phase.

The prior art techniques for dealing with these timing problems usually include three steps. First, the timing error is minimized by means of an electro-mechanical driving device and corresponding control system. Due to the inherent slow response of such driving and control systems, complete elimination of the timing error is not possible even in a carefully designed system. The residual error which remains apparently can only be reduced electronically. Secondly, a phase comparison is made between the synchronous signal read from the magnetic tape and the timing signal which can be used for controlling a variable time delay member. In the case of black and white television images, this timing error correction is satisfactory. This is not the case for color television images. This leads to the third step in which a phase comparison is made between the color synchronous signal and the studio timing signal to again control the time delay in the signal path to reduce the timing error to less than a few nanoseconds which corresponds to approximately one half of an image-point and is tolerable.

Generally, to carry out the aforementioned timing error correction system for black and white images, it is necessary to have well defined synchronous signals for the phase comparison. In the case of a device for switching between two television signals, the switching ordinarily takes place during the time period of the scanning of the horizontal synchronous signal during the front porch. This way, the discontinuity of the signal is outside the image signal portion and the synchronous signal remains undisturbed as a reference for the timing error correction system. If during the switching, the positive timing error increment occurs which is equal to or larger than the width of the front porch, then one portion of the circuit disturbance will lie within the range of the synchronous signal. This can lead to an undesirable error in the timing error correction device.

This type of situation can show up because approximately a third of the width of the front porch is needed for the switching process with interference blanking.

The instant invention allows a disturbance to form in the synchronous signal but, during the switching, maintains an undisturbed synchronous signal for measuring reference to the timing error correction system.

SUMMARY OF THE INVENTION

One of the principle objects of the invention is a system for suppressing signal disturbances, which are due to switching from a first television signal to a second television signal, for use during a playback of the television signals on a magnetic tape recorder including a magnetic tape having image structure and synchronous signals recorded thereon in line packets, each line having about the same associated line period of time, and for use in connection with an electronic switch including input means coupled to the television signals and output means being operative to be energized by a switching signal for disconnecting the first television signal and connecting the second television signal to the output means, a demodulator coupled to the output means of the switch and being operative for producing demodulated signals from the television signals, and a timing error corrector operative for receiving the demodulated signals and for reducing timing errors in the demodulated signals and features delaying means coupled between the demodulator and the timing error corrector and being operative for receiving and delaying the demodulated signals for a period of time substantially equal to the line period, switching means coupled to the demodulator for receiving the demodulated signals before they reach the delaying means and coupled to the delaying means for receiving the delayed demodulated signals and being operative for providing an output signal from the delayed demodulated signals and for switching for a period of time substantially equal to the line period for producing another output signal from the demodulated signals, and amplitude filtering means coupled to the switching means and the timing error corrector for receiving the output signals and being operative for selectively passing the synchronous signals forming a portion of the output signals to the timing error corrector.

Further objects and advantages of the invention will be set forth in part in the following specification and in part will be obvious therefrom without being specifically referred to, the same being realized and attained as pointed out in the claims hereof.

The invention accordingly comprises the features of construction, combination of elements and arrangement of parts which will be exemplified in a construction hereinafter set forth and the scope of the application of which will be indicated in the claims.

BRIEF DESCRIPTION OF THE DRAWINGS

For a fuller understanding of the nature and objects of the invention, reference is had to the following detailed description, taken in connection with the accompanying drawings, in which:

FIG. 3, including A through E, shows a set of graphs for use in describing the operation of the instant invention.

DESCRIPTION OF THE PREFERRED EMBODIMENTS

Figure 1:
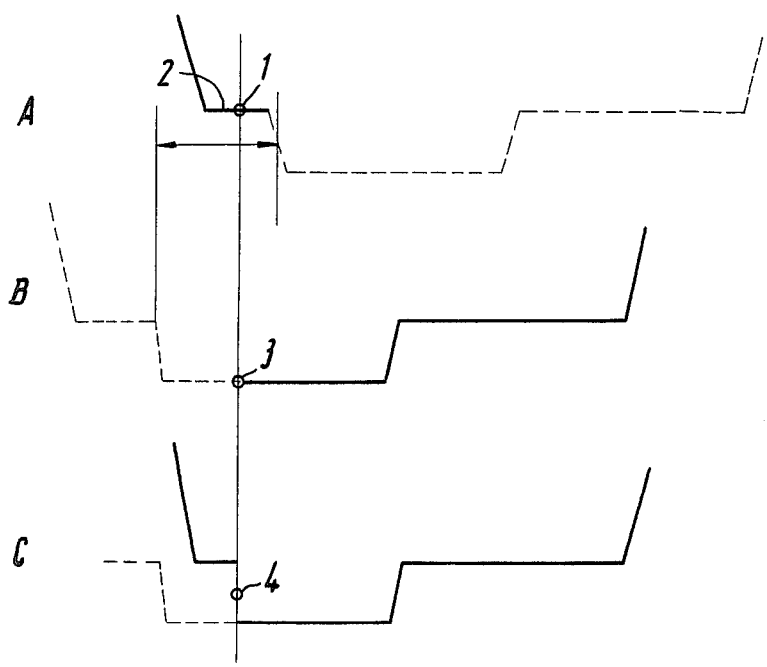
FIG. 1 shows three graphs on the same time scale illustrating the changes which can occur in a synchronous signal as a result of a timing error increment.
Figure 2:
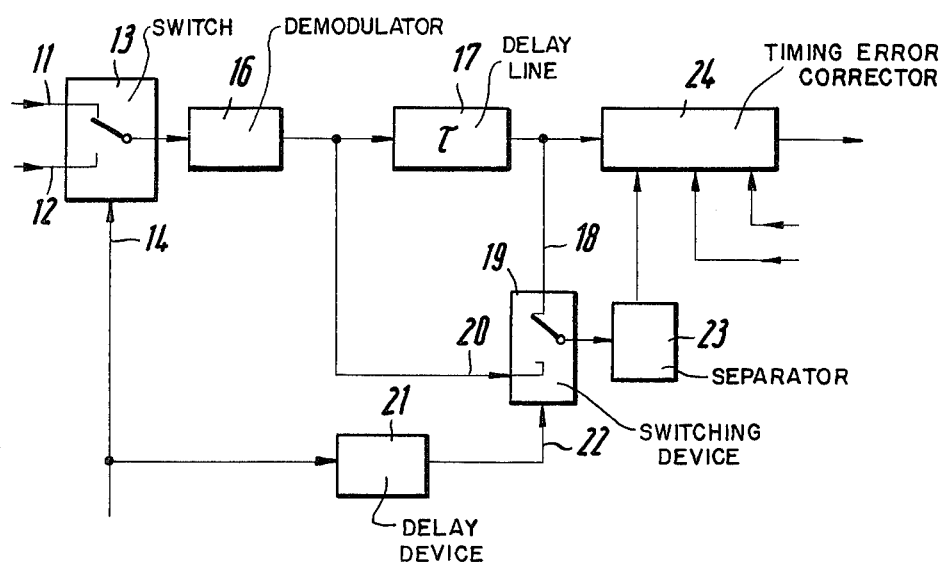
FIG. 2 shows a block diagram for carrying out the instant invention.

In carrying the invention into effect, one of the embodiments has been selected for illustration in the accompanying drawings and for description in the specification, reference being had to FIGS. 1 to 3.

The type of disturbances arising from switching from one television signal to another can be described with reference to the graphs shown in FIG. 1. Graph A shows the blanking interval of the last line of a line packet. The time of the switching is designated by numeral 1 on the front porch 2 of the blanking interval. Graph B shows the blanking interval inclusive of the first line of the following line packet. The switching time in Graph B lies at the point designated by numeral 3 between the sloping sides of the horizontal synchronous signal. Because of the timed spacement of the two lines present during the switching, a composite signal corresponding to Graph C is generated after the switching takes place. The signal portion lying to the left of the switching time point designated by numeral 4 corresponds to the signal portion of the Graph A before the occurrence of the switching and the signal portion lying to the right of point 4 corresponds to the signal portion of Graph B after the switching. The length of the horizontal synchronous signal shown in the Graph C does not correspond to the normal length and this can lead to disturbances in the timing error correction system.

Reference is had to FIG. 2 for the following explanation of the instant invention:

Two channels of television signals are generated by a system not shown and are coupled to the respective input terminals 11 and 12 of a switch 13. The television signals can be generated by a magnetic tape recorder with two transducers disposed along the periphery of its headwheel, each transducer generating one of the channels. Another source of the television signals could be a magnetic tape recorder with four transducers arranged on the periphery of the headwheel, two oppositely disposed transducers forming a single playback or reproduction channel.

The horizontal synchronous signal of the last line of the line packet can be used to generate a switching pulse signal to be applied to input terminal 14 for electronically switching the switch 13.

The output terminal of the switch 13 is coupled to a demodulator 16 for demodulating the television signals coupled from the switch 13. The demodulator 16 is coupled to a delaying means such as delaying device 17, which has a fixed delay time of substantially the duration of a single line, $\tau$. The output terminal of the delaying device 17 is coupled to an input terminal 18 of an electronic switching device 19 and another input terminal 20 of the device 19 is coupled to the demodulator 16 upstream with respect to the delay line 17. The delay line 17 is also coupled to a timing error corrector 24. Timing error correctors, also called "time base correctors," for purposes discussed here, are well known in the art of magnetic storing video signals, e.g. by U.S. Pat. Nos.

3,238,300 (Bopp et al.)
3,384,707 (Bopp et al.)
3,419,681 (Bopp et al.)
3,454,719 (Horstmann et al.)
3,505,473 (Dillenburger et al.)
3,763,317 (Coleman et al.)

The switch impulse for the switch 13 is also coupled to a pulse shaping and delaying device 21 for forming a pulse signal coupled to a control input terminal 22 of the switching device 19. The pulse signal applied to terminal 22 has the effect that for a time period which corresponds to the duration of one line $\tau$, the device 19 is switched from the input terminal 18 to the input terminal 20. The device 19 is coupled to an amplitude separator such as amplitude filtering means 23 for separating the horizontal synchronous signal from the signal coupled thereto and then coupling the synchronous signals to the timing error corrector 24 in comparison with other reference synchronous signals. Means like device 23 for separating synchronous signals from a mixed video signal are well known in the art and, for example, described in "Einfuhrung in die Fernsehtechnik", published by Fachverlag Schiele & Schon GmbH, Berlin, 1969, Volume 2, page 441 ff.

The switching device 19, taken with the device 21, constitutes a switching means and could be a composite or single device.

FIG. 3 shows the voltage-time graphs explaining the operation of the instant invention, as shown in FIG. 2. The line 31 designates the appearance of a switching pulse at input terminal 14 of the switch 13. Graph A corresponds to an output signal from the demodulator 16. At switching time 32, the blanking interval and the horizontal synchronous signal are disturbed and could lead to a significant timing error beyond the correction capabilities of the timing error corrector 24. Any signals passing through the delaying device 17 are delayed substantially one line period so that Graph B in FIG. 3 represents the output signal from the delay device 17. Simultaneously, the switching pulse applied to the input terminal 14 as shown in Graph A is coupled to the device 21 to switch from the input 18 to the input 20 for a period substantially equal to one line period.

This results in the synchronous signal having the disturbance at time 32 being replaced by the synchronous signal at the input terminal of the delay line 17. The composite signal generated by this operation is shown in Graph C. Graph E shows the signal produced by the device 21. The switch signal occurs at time 31 as shown in the Graph D and subsequently produces a pulse signal 33 for energizing the device 19.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. A system for suppressing signal disturbances, which are due to switching from a first television signal to a second television signal, for use during a playback of said television signals on a magnetic tape recorder including a magnetic tape having image structure and synchronous signals recorded thereon in line packets, each line having about the same associated line period of time, and for use in connection with an electronic switch including input means coupled to said television signals and output means and being operative to be energized by a switching signal for disconnecting said first television signal and connecting said second television signal to the output means, a demodulator coupled to the output means of said switch and being operative for producing demodulated signals from said television signals, and a timing error corrector operative for receiving said demodulated signals and for reducing timing errors in said demodulated signals, said system comprising, in combination:
delaying means coupled between said demodulator and said timing error corrector and being operative for receiving and delaying said demodulated signals for a period of time substantially equal to said line period;

switching means coupled to said demodulator for receiving said demodulated signals and coupled to said delaying means for receiving the delayed demodulated signals and being operative for providing an output signal from the delayed demodulated signals and for switching for a period of time substantially equal to said line period for producing another output signal from said demodulated signals; and amplitude filtering means coupled to said switching means and said timing error corrector for receiving said output signals and being operative for selectively passing synchronous signals forming a portion of said output signals to said timing error corrector.

2. The system as claimed in claim 1, wherein said switch and said switching means are coupled to and responsive to a pulse signal.

3. The system as claimed in claim 2, wherein said switching means comprises a pulse forming and delaying device and another electronic switch; said pulse forming delaying device being operative to generate an output signal in response to said pulse signal for energizing said another switch.

4. A system as claimed in claim 1, wherein said delaying means is a delay line.

* * * * *